United States Patent
Goldsmith (10) Patent No.: US 8,532,650 B2
(45) Date of Patent: Sep. 10, 2013

(54) APPARATUS AND METHOD FOR RADIOS OCCUPYING A COMMON FREQUENCY REGION

(75) Inventor: Michael Goldsmith, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 740 days.

(21) Appl. No.: 11/468,082

(22) Filed: Aug. 29, 2006

(65) Prior Publication Data

US 2008/0057967 A1    Mar. 6, 2008

(51) Int. Cl.
*H04W 4/00* (2009.01)

(52) U.S. Cl.
USPC ........ 455/434; 370/347; 375/132; 455/452.1; 455/452

(58) Field of Classification Search
USPC ....... 455/434, 452.1, 451; 370/347; 375/132
See application file for complete search history.

(56) References Cited

U.S. PATENT DOCUMENTS

| | | | |
|---|---|---|---|
| 7,317,900 | B1 | 1/2008 | Linde et al. |
| 2002/0021746 | A1* | 2/2002 | Schmidl et al. ............... 375/132 |
| 2003/0125019 | A1 | 7/2003 | Bajikar |
| 2004/0028003 | A1 | 2/2004 | Diener et al. |
| 2005/0195859 | A1 | 9/2005 | Mahany |
| 2006/0030318 | A1* | 2/2006 | Moore et al. .................. 455/434 |

FOREIGN PATENT DOCUMENTS

| | | |
|---|---|---|
| CA | 2599023 A1 | 2/2008 |
| EP | 1 207 654 A2 | 5/2002 |
| EP | 1895719 | 3/2008 |

OTHER PUBLICATIONS

IEEE Computer Society: "IEEE 802.15.2: Part 15.2-Coexistence of Wireless Personal Area Networks with Other Wireless Devices Operating in Unlicensed Frequency Bands" IEEE Standards, [Online] 28 Aug. 20003, pp. 1-43, XP002419622 New York, US. Retrieved from the Internet: URL: http://standards.ieee.org/reading/ieee/std/lanman/restricted/802.15.2-2003.pdf [retrieved on Feb. 12, 2007].
Extended European Search report for corresponding EP patent application No. EP 06119682.0 dated Feb. 22, 2007.
European Search Report dated Jul. 30, 2008, European Application No. 06119682.0.
Cabric, D.; Mishra, S.M.; Willkomm, D; Brodersen, R.W.; Wolisz, A.; "A Cognative Radio Approach for Usage of Virtual Unlicensed Spectrum", 14th IST Mobile and Wireless Communications Summit, Jun. 11-14, 2005.
Sydor, John; "5 GHz Cognitive Radio: An Approach to Rural Community Broadband Access", published on Internet on Jun. 29, 2005. http://www.crc.ca/en/html/milton/home/white_papers.
Communication under Rule 71(3) EPC dated Mar. 24, 2009, European Patent Application No. 06119682.0.
Decision to Grant dated Jul. 30, 2009, European Patent Application No. 06119682.0.
Exam Report for EP patent application No. 06119682 dated Sep. 20, 2007.

(Continued)

*Primary Examiner* — Wayne Cai
*Assistant Examiner* — Michael Irace
(74) *Attorney, Agent, or Firm* — Bereskin & Parr LLP/S.E.N.C.R.L., s.r.l.

(57) ABSTRACT

Various embodiments for a communication control configuration and a communication control method are described for wireless communication devices having at least two radios that can potentially interfere with one another. The control schemes described herein reduce the likelihood that the two radios will interfere with one another during operation.

11 Claims, 9 Drawing Sheets

(56) References Cited

OTHER PUBLICATIONS

Canadian Office Action dated Dec. 13, 2010, Canadian Patent Application No. 2,599,023.
Canadian Office Action for Canadian Patent Application No. 2,599,023 dated Jan. 25, 2012,.
Response to Search/Exam Report for European Patent Application No. 06119682.0, dated May 24, 2007.
Reply to Communication from the Examining Division for European Patent Application No. 06119682.0, dated Mar. 27, 2008.
Reply to Communication pursuant to Art 94(3) for European Patent Application No. 06119682.0, dated Dec. 11, 2008.
Certificate of Grant for European Patent Application No. 06119682.0, European patent No. 1895719 dated Aug. 26, 2009.
Document relating to CA Application No. 2599023, dated Jun. 4, 2013 (Notice of Allowance).

* cited by examiner

APPARATUS AND METHOD FOR RADIOS OCCUPYING A COMMON FREQUENCY REGION

FIELD

Embodiments of an apparatus and method are described herein that generally relate to the operation of radios that occupy a common frequency region. More particularly, exemplary embodiments of an apparatus and method are described herein for mobile devices having at least two wireless communication modules or radios that can potentially interfere with one another.

BACKGROUND

Some peripheral wireless devices, such as mobile communication devices or personal data assistants, have at least two wireless communication subsystems (or modules) that both include a radio that can receive and send data wirelessly. Another example includes personal computers or laptops with Wireless Local Area Network (WLAN) internet access and a Bluetooth (BT) connection to input device such as a mouse. Other examples include a laptop or cellular telephone with WLAN access and a BT-enabled headset. The two radios may generally operate within the same frequency bands, in which case it is important for the two communication modules to operate such that they do not interfere with one another.

In one example, a mobile communication device can include a long-range wireless radio, and a short-range wireless radio. An example of a long-range wireless radio is a WLAN radio. An example of a short-range wireless radio is a BT radio. Generally, a BT radio can transmit a signal that collides with a WLAN signal. However, for BT audio transmission or Voice-Over-IP (VoIP) over WLAN, error packet rates greater than a few percent can cause intolerable audio delays or dropped calls.

Currently there are several time-only or frequency-only based methods for supporting co-location of these radios. Examples of time-only based methods are Packet Transmission Arbitration (PTA) algorithms, which allow time division of the shared frequency spectrum. Examples of frequency-only based methods are pseudo-random Adaptive Frequency Hopping (AFH) algorithms that can be used by the BT radio to avoid interference with the WLAN radio. However, these algorithms do not adequately handle transitions by the WLAN radio to a new frequency region or communication channel. For instance, PTA ensures that one radio will not transmit while the other radio is receiving, which would result in loss of reception. AFH can eventually determine that the BT radio is experiencing interference (due to the operation of the WLAN radio) and will avoid the operating frequency region of the WLAN radio, but the time that is required to make this determination and adjustment is too long in some cases. For example, if this situation occurs during a VoIP call, then it will cause voice samples to be missed, since the voice samples have a limited period of time during which they need to be transmitted or received. Further, it is very likely that this time is less than the time required for the AFH algorithms to detect interference and adjust the operating frequency region of the BT radio to exclude the frequency region where interference occurs.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment and in which.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a wireless mobile communication device, hereafter referred to as a mobile device. In general, the mobile device can be a two-way communication device with advanced data communication capabilities including the capability to communicate with other mobile devices or computer systems through a network of transceiver stations. The mobile device can also have components that have the capability to allow voice communication. The mobile device has at least two wireless communication subsystems, which can also be referred to as wireless communication modules, or radios. The wireless communication subsystems can generally operate in the same frequency regions. Depending on the particular embodiment and the functionality provided by the mobile device, it may be referred to as a data messaging device, a two-way pager, a cellular telephone with data messaging capabilities, a cellular smart-phone, a wireless Internet appliance, a wireless organizer, a personal digital assistant, a handheld wireless communication device, a wirelessly enabled notebook computer, a data communication device (with or without telephony capabilities), and the like. Those skilled in the art are knowledgeable in the components required for these different embodiments. However, to aid the reader in understanding the general structure of the mobile device and how it communicates with other devices and host systems, reference is now made to FIGS. 1-3.

Figure 1:
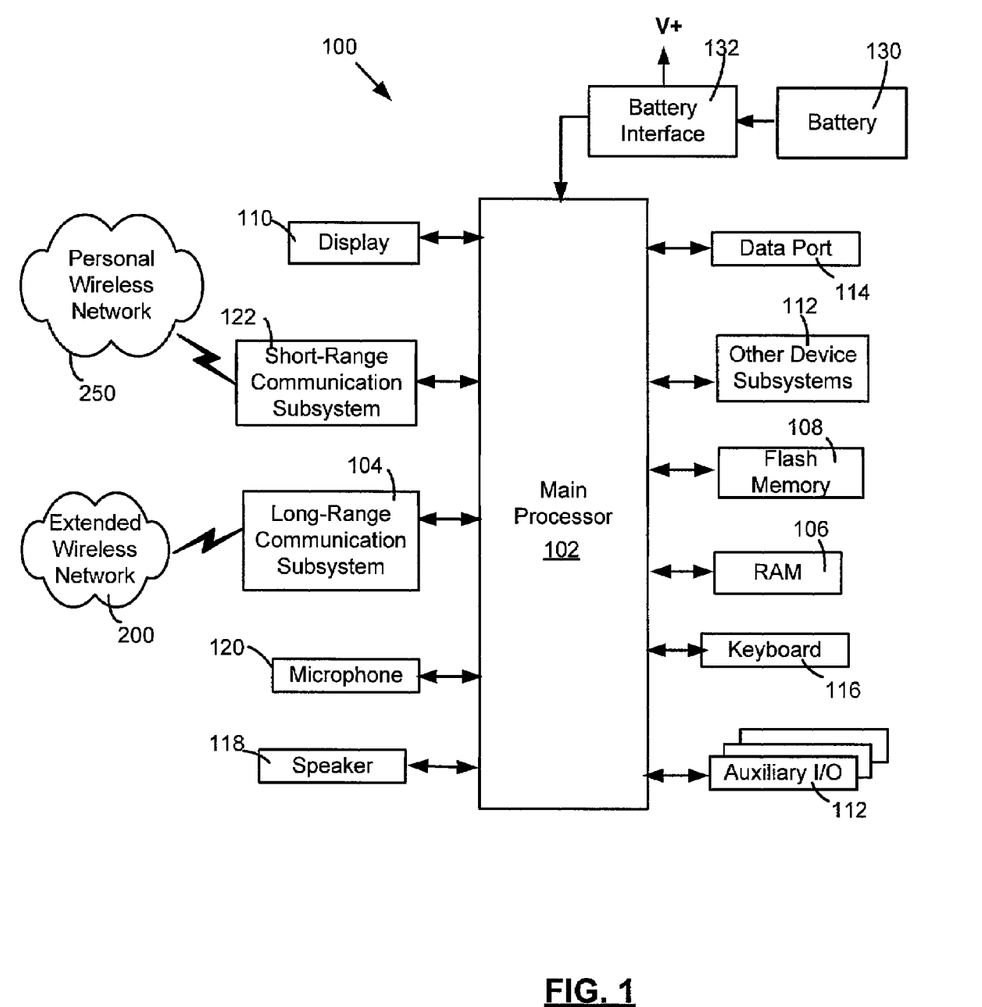
FIG. 1 is a block diagram of an exemplary embodiment of a mobile device.

Referring first to FIG. 1, shown therein is a block diagram of an exemplary embodiment of a mobile device 100. The mobile device 100 includes a number of components such as a main processor 102 that controls the overall operation of the mobile device 100. Communication with a wide-area or local-area network, including data, and in alternative embodiments voice communication, are performed through a long-range communication subsystem 104. The long-range communication subsystem 104 can receive messages from, and send messages to, an extended wireless network 200. In this exemplary embodiment of the mobile device 100, the communication subsystem 104 can be configured in accordance with the IEEE 802.11 standard. Accordingly, the wireless link connecting the communication subsystem 104 with the wireless network 200 represents one or more different Radio Frequency (RF) channels, operating according to defined protocols specified for IEEE 802.11 communication. Those skilled in the art are familiar with various implementations of the extended wireless network 200.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a short-range communication subsystem 122 and other device subsystems 114. The mobile device 100 can be battery powered and include corresponding components such as one or more batteries 130 and a battery interface 132, as is commonly known by those skilled in the art.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the extended wireless network 200, and device-resident functions such as a calculator or task list.

The auxiliary I/O subsystem 112 may include devices such as: a touch screen, mouse, track ball, an infrared, capacitive or optical fingerprint detector, or a multi-direction actuator or roller wheel with dynamic button pressing capability. The keyboard 116 is preferably an alphanumeric keyboard and/or telephone-type keypad. However, other types of keyboards may also be used.

The mobile device 100 can send and receive communication signals over the extended wireless network 200 after required network registration or activation procedures have been completed. Network access is associated with a unique identifier for the mobile device 100, or a subscriber or user of the mobile device 100 as is commonly known by those skilled in the art such as using Subscriber Identity Module or Removable User Interface Module. For strict IEEE 802.11 communication, this unique identifier appears as the Medium Access Controller (MAC) address of the WLAN radio, and additional network handshaking involving security credentials may be required to ensure full communication with the wireless network 200, as is commonly known by those skilled in the art.

The mobile device 100 is a battery-powered device. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system along with software programs for various applications that are executed by the main processor 102. The programs are typically stored in a persistent store such as the flash memory 108, which may alternatively be a read-only memory (ROM) or similar storage element (not shown). Those skilled in the art will appreciate that portions of the operating system and other software components, such as specific device applications, or parts thereof, may be temporarily loaded into a volatile store such as the RAM 106. Other software components can also be included, as is well known to those skilled in the art. Depending on the particular embodiment of the mobile device, software programs can include a message application for sending and receiving electronic messages, an address book, a personal information manager, a device state module and other suitable programs, all of which are well known by those skilled in the art.

The additional applications can be loaded onto the mobile device 100 through at least one of the extended wireless network 200, the auxiliary I/O subsystem 112, the data port 114, the short-range communication subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery (not shown) of the mobile device 100.

The short-range communication subsystem 122 provides for communication between the mobile device 100 and different systems or devices within a designated group such as a Personal Wireless Network 250, without the use of the extended wireless network 200. For example, the Personal Wireless Network 250 may be embodied as a Wireless Personal Area network (WPAN). In some cases, the short-range subsystem 122 can include a Bluetooth radio, a ZigBee device, a Wireless USB device, or an Ultra-Wideband (UWB) radio, for example. Examples of short-range communication standards include the Infrared Data Association (IrDA), Bluetooth, ZigBee, WUSB, UWB and the IEEE 802.15 standards.

Figure 2:
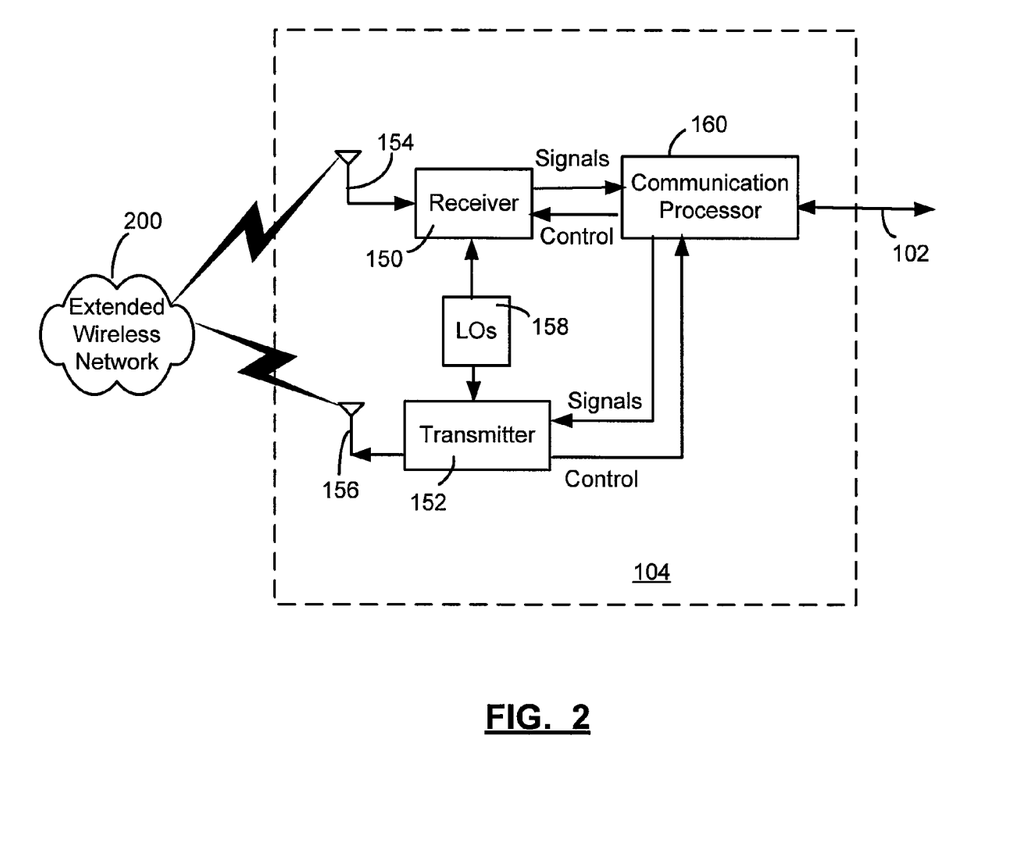
FIG. 2 is a block diagram of an exemplary embodiment of a communication subsystem of the mobile device of FIG. 1.

Referring now to FIG. 2, a block diagram for an exemplary embodiment of the communication subsystem component 104 is shown. The communication subsystem 104 comprises a WLAN radio that includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the extended wireless communication network 200 with which the mobile device 100 is intended to operate. Thus, it should be understood that the design illustrated in FIG. 2 serves only as one possible example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 can process communication signals, and can provide for receiver and transmitter control. For example, the gains applied to communication signals in the receiver 150 and the transmitter 152 may be adaptively controlled through automatic gain control algorithms implemented in the DSP 160.

The wireless link between the mobile device 100 and the extended wireless network 200 can contain one or more different channels, typically different RF channels, and associated protocols used between the mobile device 100 and the extended wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the extended wireless network 200 and is otherwise turned off to conserve resources. Similarly, the receiver 150 is periodically turned off to conserve power until it is needed to receive signals or information (if at all) during designated time periods.

Figure 3:
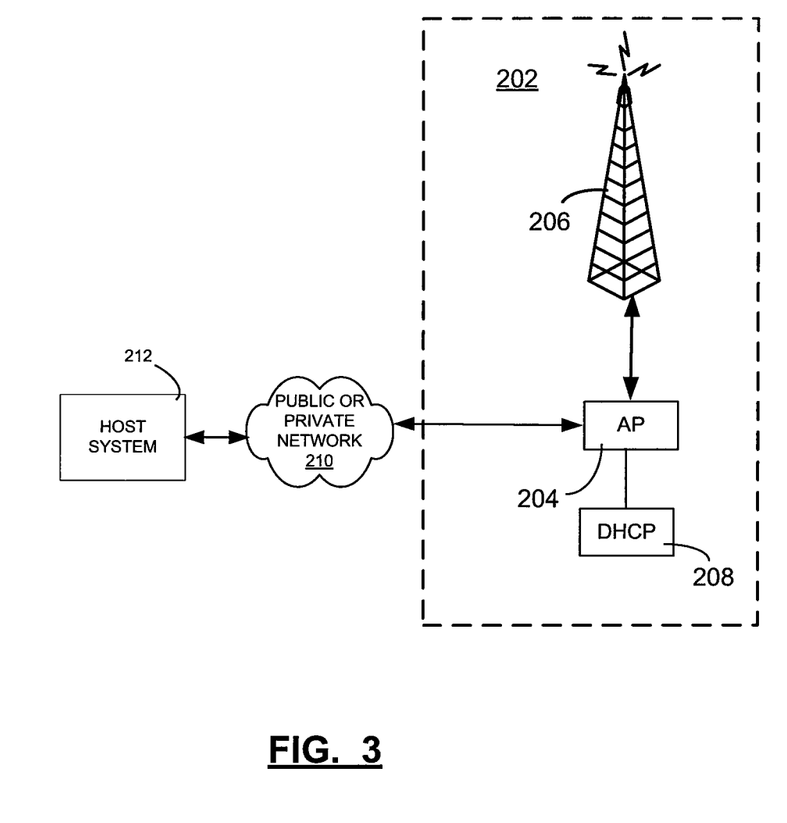
FIG. 3 is an exemplary block diagram of a node of a wireless network.

Referring now to FIG. 3, a block diagram of an exemplary implementation of a node 202 of the extended wireless network 200 is shown. In practice, the extended wireless network 200 comprises one or more nodes 202. The mobile device 100 can communicate with the node 202 within the extended wireless network 200. In the exemplary implementation of FIG. 3, the node 202 is configured in accordance with IEEE 802.11 standard. The node 202 includes an access point (AP) 204 with an associated antenna or tower station 206, and a Dynamic Host Configuration Protocol (DHCP) server 208, which may or may not be integrated into the AP 204. This list of components is not meant to be an exhaustive list of the components of every node 202 within an IEEE 802.11 network, but rather a list of components that are commonly used in communication through the network 200. Furthermore, there are cases in which the AP 204 is not situated on a tower, but rather the AP 204 has antennas attached to it.

In an IEEE 802.11 network, the connection through the AP 204 to a public or private network (Internet) 210 (also referred to herein generally as a shared network infrastructure) represents the data path for packet switched data to host system 212.

The station 206 is a fixed transceiver station or antenna and together with the AP 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

If left unchecked, there can be instances in which the wireless communication subsystem 104 and the short-range communication subsystem 122 can operate in the same frequency region and interfere with one another. Typically, in a steady-state condition, both of the communication subsystems are operating such that there is no interference, and at least one of the communication subsystems is aware of the operating frequency region of the other communication subsystem. For instance, the short-range communication subsystem 122 knows of the current operating frequency region of the wireless communication subsystem 104 by conventionally performing a detection algorithm for frequencies for which interference occurs. The operating frequency region of the short-range communication system 122 is then set to exclude the operating frequency region of the wireless communication subsystem 104. In particular, if the short-range communication system 122 operates at different channels in its operating frequency region, these channels will not coincide with the current known operating frequency region of the wireless communication subsystem 104. It should be noted that the term frequency region covers instances in which the frequency region is continuous (for an example, see first frequency region 402 in FIG. 6A), and discontinuous (for an example, see frequency sub-regions 404 and 406 which form a second frequency region in FIG. 6A). Furthermore, a frequency region can include a single communication channel or multiple communication channels.

However, there are times when the wireless communication subsystem 104 changes its operating frequency. When the mobile device 100 travels in various geographic areas, the device switches its connection from one AP 204, i.e. associated with tower station 206 (i.e. antenna), to another AP. This is done to maintain strong transmitted and received communication signals since these communication signals get weaker as the mobile device 100 moves away from the AP that it is currently connected to, meanwhile the communication signals from APs that the mobile device 100 is approaching get stronger (this can be determined based on the receive sensitivity level or RSSI of the wireless transmissions, for example). Accordingly, the communication subsystem 104 will attempt to connect with a new AP, which is typically in a different operating frequency region. It is at this point that it is beneficial for the short-range communication system 122 to be aware that a new operating frequency region is being proposed for the wireless communication subsystem 104.

Figure 4:
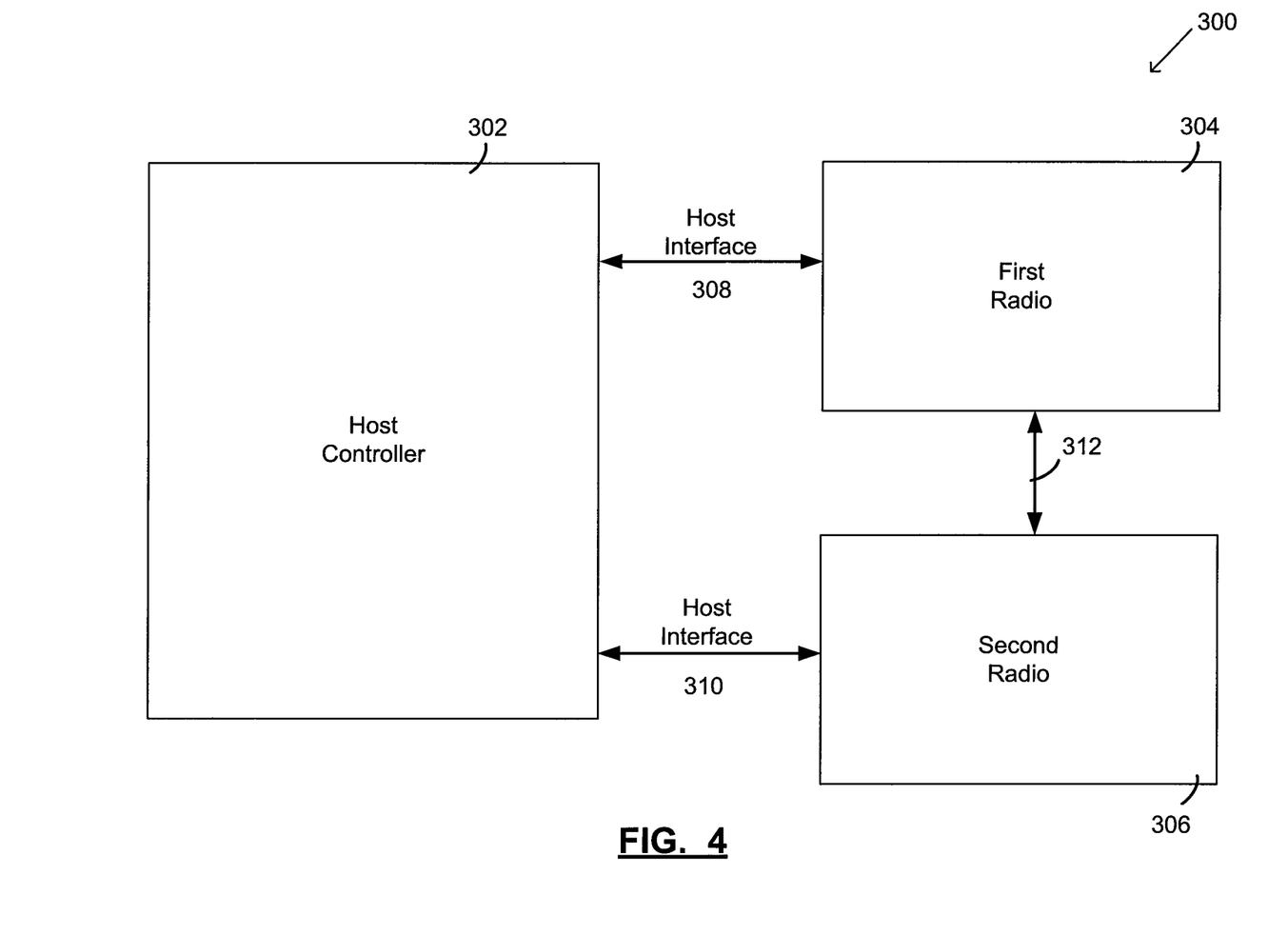
FIG. 4 is a schematic block diagram of an exemplary embodiment of a control scheme for controlling two potentially interfering communication subsystems in a mobile device.

FIG. 4 provides a schematic block diagram for an exemplary embodiment of a control scheme that can generally be applied to any wireless communication device that has two communication subsystems that can potentially interfere with one another. In particular, FIG. 4 shows a portion of a wireless communication device 300 having a controller 302, a first radio 304 and a second radio 306. The first and second radios 304 and 306 are connected to the host controller 302 via host interface connections 308 and 310 respectively. There is also an optional connection 312 between the first and second radios 304 and 306. The connection 312 can be used in situations that require strict timing requirements, since the delay that is introduced when the radios 304 and 306 communicate through the host controller 302 may not be acceptable in these situations. The connection 312 can be a bidirectional serial or parallel data link, bidirectional logic signaling or interrupts and the like.

The host controller 302 can receive information from the first and second radios 304 and 306, process this information, and provide appropriate control instructions to the first and second radios 304 and 306 to prevent interference between these radios. The radios 304 and 306 can be any wireless radios that can potentially interfere with one another, and in some embodiments can be a long-range and a short-range wireless radio, respectively. For example, with regards to the mobile device 100, the host controller 302 can correspond to the main processor 102, and the first and second radios 304 and 306 can correspond to the communication subsystem 104 and the short-range communication subsystem 122, respectively.

The host controller 302 can be any suitable microprocessor. The host controller 302 can be implemented with an applications processor or a communication processor that is independent of the radios 304 and 306. However, there can also be some implementations in which the first radio 304 has a processor that can be used to implement the functionality of the host controller 302. There can also be some implementations in which the second radio 306 has a processor that can be used to implement the functionality of the host controller 302.

An applications processor typically has a single-core architecture and performs integer and possibly floating-point arithmetic. A communication processor typically has a dual-core architecture, with an integer processing core and a digital signal processing core. Different mobile device designs may use either an applications processor only (in the case of a PDA or WLAN-only mobile device), a communication processor only (in the case of a cellular phone), or both (in the case of a "smart" mobile phone).

In the case where both applications and communications processors are used, more than one controller external to the radios 304 and 306 can provide the functionality of the host controller 302. For instance, one of the radios can be coupled with a communication processor (which is also controlling some of the long-range communication), and the other radio can be coupled with an applications processor. The applications and communication processor can be connected via a high-speed bus. In this case, the applications processor can perform the "decision" logic, and the communication processor can perform portions of the "control" logic.

In other implementations, at least two of these components can be implemented on a common IC. For instance, some devices have a combination Wi-Fi and BT PCMCIA/miniPCI card, such as a laptop for example, in which case the host controller 302 can be a processor embedded in one of the radios, or on the card, and not actually the CPU of the device itself.

The architecture of the radios 304 and 306 can be described as shown in FIG. 2. Alternatively, the architecture of at least one of the radios 304 and 306 can be similar to a radio-modem which typically includes a Media Access Controller (MAC), a Baseband/Physical Controller (PHY), and a Radio Front-end (RF), as is well known by those skilled in the art. The MAC includes digital circuitry that is accessible by a processor, and usually contains timers, and control registers, and the like. The PHY section performs digital-to-analog conversion, modulation/demodulation, filtering, and the like. The RF section includes circuitry for performing amplification, filtering, frequency synthesis and mixing, and the like. A radio-modem can include an integrated processor that executes the lowest-level of radio stack firmware, but this may not always be the case. Furthermore, if both radios 304 and 306 have a radio-modem configuration, then the connection 312 can be in accordance with 802.15.2 MAC-MAC signaling; i.e. there can be multiple wires for transmitting timing synchronization signals, such as PTA signals, between the two radios 304 and 306. However, the radios 304 and 306 do not strictly only communicate with one another because there are operations that have to be performed which are usually done at higher levels (of a radio OSI stack). For instance, certain types of processing can be done based on the receive signal sensitivity level.

Alternatively, there can also be some implementations in which a communication subsystem with both long-range and short-range radios, and a control processor are on a common IC. For this case, additional MAC-MAC communication beyond timing synchronization signals can be used, and more of the discovery and control processing can be moved from higher levels of the OSI stack to lower levels.

Figure 5:
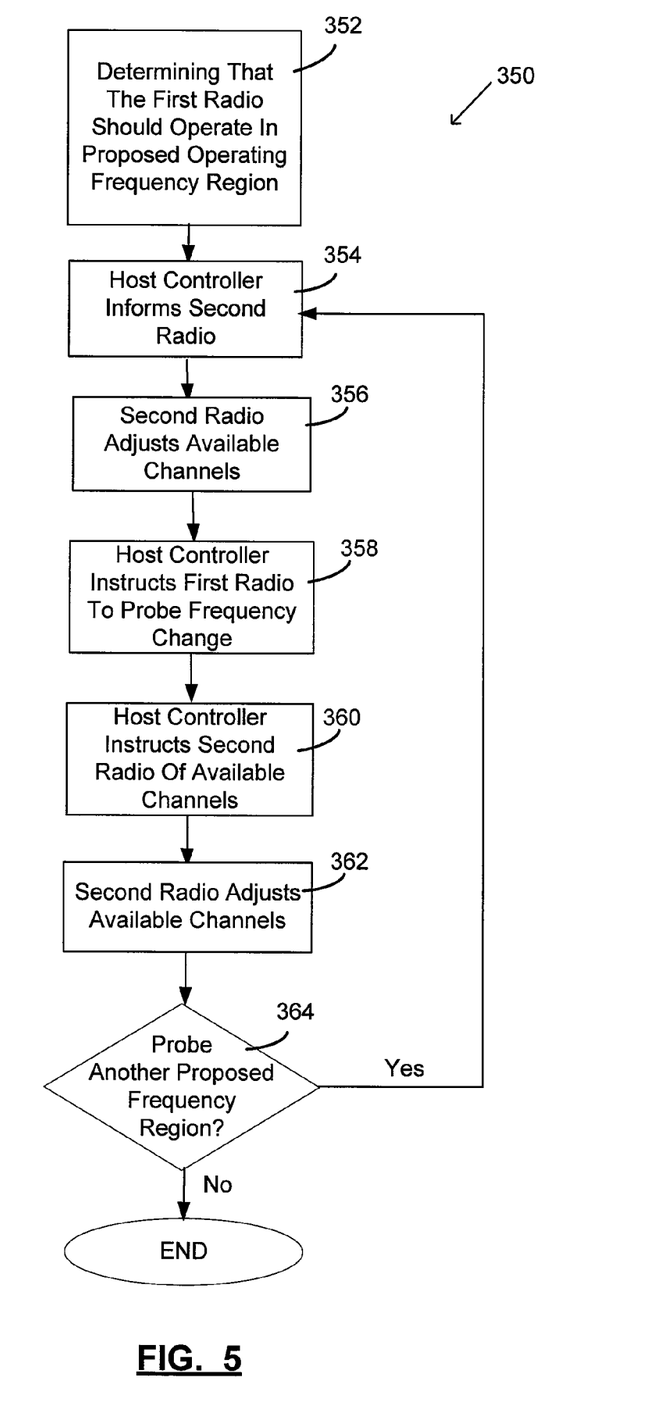
FIG. 5 is a flowchart diagram of an exemplary embodiment of a communication control method for controlling two potentially interfering communication subsystems in a mobile device.

With the general architecture shown in FIG. 4, the host controller 302 can control transitions for the operating frequency regions of the first and second radios 304 and 306 according to a communication control method 350. FIG. 5 shows a flowchart diagram of an exemplary embodiment of the communication control method 350. The two radios 304 and 306 are initialized such that the first radio 304 is operating in a first frequency region and the second radio 306 is operating in a second frequency region. Generally, these two frequency regions are exclusive of one another so that the radios 304 and 306 do not interfere with one another. The host controller 302 has control of both radios 304 and 306 and is aware of the operating state of both radios. Given the close proximity of the two radios within the mobile device 300 it is likely, as is known by those skilled in the art, that simultaneous operation of both radios in close frequency regions will result in a degradation of signal on the radio that is currently receiving wireless signals. This is because, due to the close proximity of the two transceivers, signals being transmitted from one radio can be large enough to saturate the receiver front-end of the other radio. This can occur despite a frequency offset since the wideband noise floor of a transmitter may be high enough to interfere with the signal that is being received by the other radio. Accordingly, to ensure harmonious operation of both radios it is required to schedule transmission and reception of information on both radios to ensure time division multiplexing of the overall communication channel. The techniques outlined herein require time-division of the overall communication channel, which can be achieved using PTA for example. Also, frequency division of the communication channel is still important since there can be interference with other radios that can transmit at the same time to the radios of the mobile device 300, since although frequency and time division are used, the radios 304 and 306 may still receive signals at the same time. For instance, the WLAN access point is not aware that the mobile device 300 includes a BT radio. Furthermore, the WLAN access point is asynchronous and communication is not scheduled, which means there is no control, from the point of view of the device 300, when transmissions from the WLAN access point occur. Accordingly, the WLAN access point may transmit at inappropriate times when the radio 306, which can be a BT radio, is attempting to receive a wireless signal from another device on a WPAN. In a likewise fashion, a BT radio from a WPAN may transmit at the same time that the WLAN radio of the mobile device 300 is receiving. In both cases, without frequency division described herein, interference can occur.

At step 352, a change to a new proposed operating frequency region is determined for one of the radios 304 and 306, such as the first radio 304 for example, and this change is noted by the host controller 302. This can occur during active probing of additional APs within the communication range of the mobile device or when the mobile device attempts to associate with a second AP. For instance, based on RSSI feedback from the first radio 304, the host controller 302 can determine when probing should be started for additional APs. Alternatively, in some cases, the first radio 304 can make this determination. In another alternative, the user of the mobile device 300 may initiate the change to a proposed operating frequency region, and the host controller 302 or first radio 304 determines if such an event occurs. Determining that the first radio 304 should operate in a proposed operating frequency region can include each of these scenarios. At step 354, the host controller 302 informs the second radio 306 of the proposed change, and instructs the second radio 306 to reduce the number of channels in the second operating frequency region that are available for communication.

At step 356, the second radio 306 adapts to the proposed operating frequency region by noting the channels that are now available for communication based on the current operating frequency region of the first radio 304 and the proposed operating frequency region. Alternatively, the second radio 306 can mark the channels in the proposed operating frequency region as being unavailable (the second radio would have already marked the channels in the first frequency region as being unavailable). The second radio 306 can also use this information to adjust any algorithms that are used to determine the communication channels that are available for communication. The second radio 306 then sends an acknowledgement to the host controller 302.

At step 358, after the host controller 302 receives acknowledgement that the adjustment has been made by the second radio 306, the host controller 302 can instruct the first radio 304 to attempt to switch to, or probe, the new proposed operating frequency region. The first radio 304 then transmits a command on an alternate channel in the proposed frequency region and receives a probe response from a target AP. Depending on the relative position of the device 300 to the target AP, there may be multiple responses. The first radio 304 can then report communication statistics for the target AP to the host controller 302. The host controller 302 can use these statistics to decide whether the mobile device 300 should make an association with the target AP. If a switch is appropriate, the host controller 302 can instruct the first radio 304 to transmit an association request to the target AP. Otherwise, the host controller 302 can instruct the first radio 304 to continue operating in its current operating frequency region. If an association request is made, then the first radio 304 receives an association response from the target AP indicating success or failure.

At step 360, the host controller 302 advises the second radio 306 on the success of the change to the new proposed operating frequency region, and the effect for available communication channels. For instance, if the switch was not appropriate, then the host controller 302 can instruct the second radio 306 to increase the number of available communication channels, specifically to include use of the channels that correspond to the new proposed operating frequency region. Alternatively, if the switch to the new proposed frequency region was successful, the host controller 302 can advise the second radio 306 that the previous operating frequency region that was used by the first radio 304 is no longer occupied, and the second radio 306 can reclaim the channels in the previous operating frequency region. The host controller 302 can also note that the current operating frequency region of the first radio 304 has been replaced with the new proposed frequency region. At step 362, the second radio 306 adapts the channels that are available for communication and can send an acknowledgement of this to the host controller 302.

In some cases, steps 360 and 362 can be optional if the operating frequency region of the second radio 306 is large enough that the exclusion of available channels for communication do not impact on the performance of the second radio 306, and/or if the first radio 304 requests changes to a new proposed operating frequency regions rather infrequently. However, in the cases in which channels have just become available, depending on the success or failure of the first radio 304 to switch to a different operating frequency region, then steps 360 and 362 can be performed to increase the number of available channels in the operating frequency region of the second radio 306. However, for systems such as Bluetooth, where an average minimum frequency spreading must be maintained during device operation, it is imperative that steps 360 and 362 be performed in a timely fashion to ensure this average minimum frequency spreading rule. Those skilled in the art are aware that Bluetooth devices need to occupy, on the average, with respect to a certain amount of time, a certain number of frequency channels. Accordingly, for radios that use frequency spreading, the amount of time for which more than one frequency region is blocked off (such as frequency regions 402 and 408 in FIG. 6C), needs to be long enough to ensure that a response from an AP is received (which depends on how heavily loaded the AP is), while being short enough so that the minimum frequency spreading rule is maintained on average. The average time required for the minimum frequency spreading rule to certify that the device is compliant varies depending on the device.

If the request to operate at a different operating frequency region is not successful, then at step 364 it is determined whether there are other frequency regions that the first radio 304 can operate at. For instance, there can be multiple communication channels that are being probed for a suitable alternate AP. If this is true, then the method 350 returns to step 354 and the host controller 302 informs the second radio 306 of another proposed frequency change (which is the next proposed operating frequency region that is being checked in the probing scheme). Otherwise, the method 350 ends.

To further illustrate the communication control method 350 with an example, the first radio 304 can be a long-range wireless radio such as an IEEE 802.11 radio (or more generally a WLAN radio), and the second radio 306 can be a short-range radio such as a Bluetooth (BT) radio (or more generally a WPAN radio). The firmware of the first radio 304, and the firmware of the second radio 306 can communicate with the host controller 302. Further, the second radio 306 can use an AFH algorithm to determine which channels are available for communication. Initially both radios 304 and 306 are on and operating in a known, stable state, and the AFH algorithm can be configured to avoid the channels within the first operating frequency region of operation of the first radio 304. The radios 304 and 306 are also operating under a form of timing synchronization such as PTA. Thereafter, the second radio 306 can modify parameters of the AFH algorithm in accordance with the steps of method 350 to avoid certain channels and add available channels based on whether the first radio 304 switches to a new possible operating frequency region. As discussed above, the process of removing and adding available channels to the AFH algorithm must be performed in a timely fashion in order to maintain on average the minimum frequency spreading rules as outlined by the Bluetooth protocol.

The communication control method 350 allows the BT radio to quickly note the channels that are not available for communication, since the explicit channels to avoid are provided based on the activity of the first radio 304 before the first radio 304 begins transmitting in a new operating frequency region. Accordingly, rather than waiting for the AFH algorithm to determine that a channel is bad, specific channels can be marked as "bad" through the host control interface 310 or interface 312 in some cases. This transition period may limit the throughput of communication for the BT radio, but should not halt all communication.

This is in contrast to the conventional method in which the BT radio measures activity on a given channel, and stops or avoids transmitting on the given channel if signal activity from the first radio 304, or other interference, is detected. However, in the conventional method the BT radio needs to determine that transmitting data on a certain channel is not possible more than once (usually back-to-back) before the BT radio marks that channel as "bad", after which the BT radio will wait a specified time before trying to transmit on that channel again. This time delay is not acceptable in certain situations such as during a Voice-over-IP (VoIP) call, since certain voice samples will be missed.

To further illustrate this example, it should be noted that the IEEE 802.11 communication standard divides the wireless WLAN spectrum band into approximately 14 channels (depending on a particular country or geographical area), and the APs and mobile devices both utilize one of these channels for communication. In contrast, the IEEE 802.15 communication standard (for BT radios) divides the same spectrum into approximately 72 channels. Furthermore, devices operating on a BT piconet that use a pseudo-random AFH algorithm switch channels every 1.25 ms. Parameters for the FH algorithm can be determined by the piconet master's MAC address and some other factors. Accordingly, since the BT radio changes channels very frequently in comparison to the WLAN radio, the operating frequency region or spectrum of the BT radio is dictated by the operating frequency region of the WLAN radio.

Figure 6A:
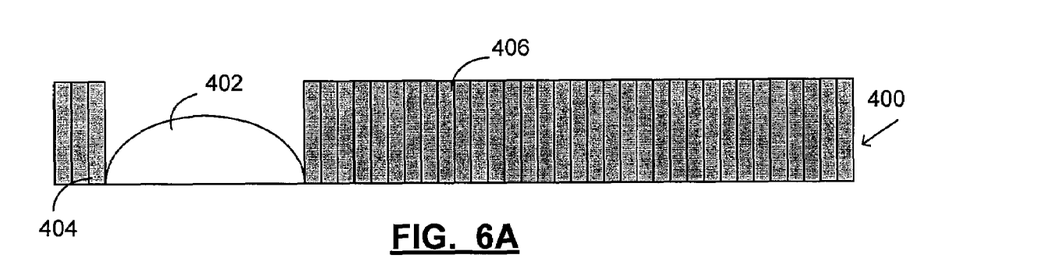
FIGS. 6A-6D are a series of spectral plots showing the operation of a mobile device, having two potentially interfering communication subsystems, according to the communication control method for a first scenario.
Figure 6B:
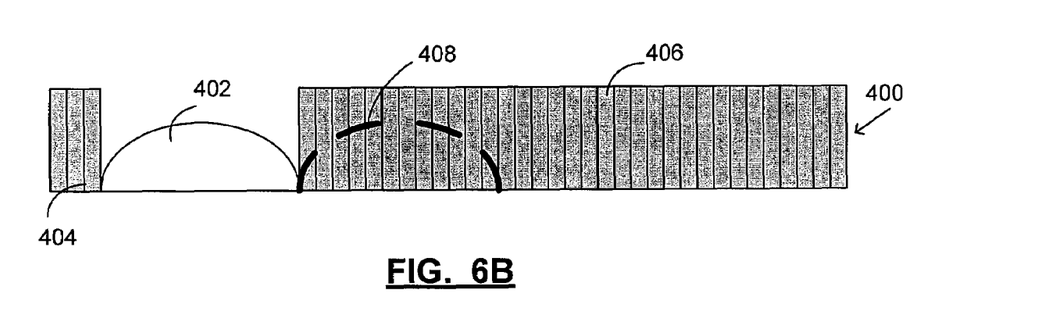
Figure 6C:
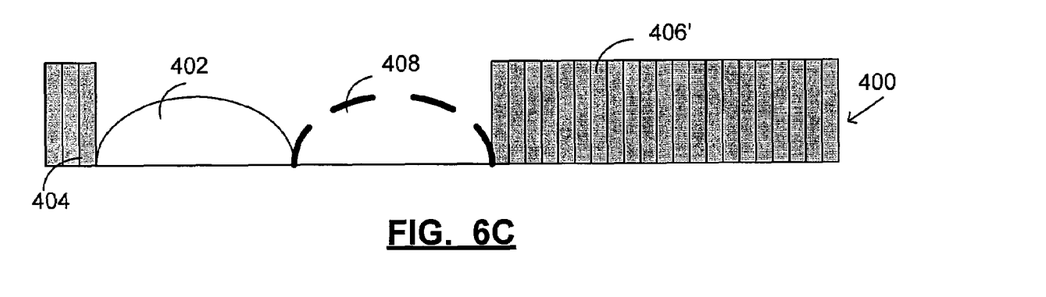
Figure 6D:
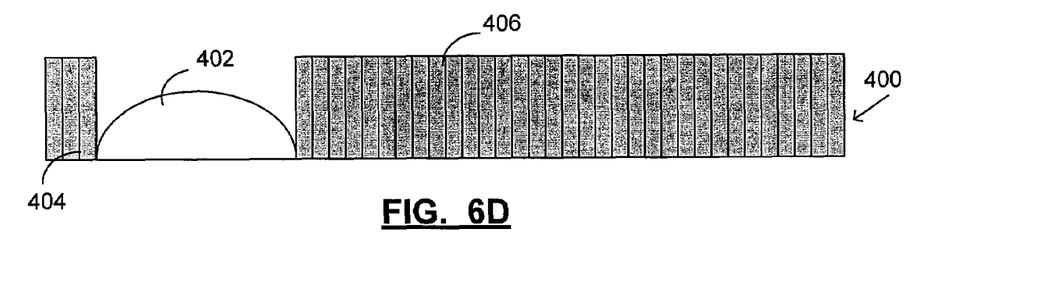

Referring now to FIGS. 6A-6D, shown therein are a series of spectral plots showing the operation of a mobile device, having potentially interfering long-range and short-range radios, according to the communication control method 350 for a first scenario. FIG. 6A shows that the spectrum 400 includes a first operating frequency region 402 at which the first radio 304 operates, and a second operating frequency region made up of channels contained in frequency sub-regions 404 and 406 in which the second radio 306 operates. FIG. 6B shows that, at some point in time, a proposed operating frequency region 408 is proposed for the first radio 304. The host controller 302 then informs the second radio 306 that the first radio 304 will attempt to operate in the proposed operating frequency region 408, and the second radio 306 adjusts the number of available channels such that the second operating frequency region now includes frequency sub-regions 404 and 406'. The host controller 302 instructs the first radio 304 to attempt to change to the proposed operating frequency region 408, but the first radio 304 is not successful. The host controller 302 informs the second radio 306 of this failed attempt, and the second radio 306 reclaims the channels that were given up for the proposed operating frequency region 408. The first radio 304 continues to operate in the first operating frequency region 402, and the second radio 306 continues to operate in the second operating frequency region that includes frequency sub-regions 404 and 406.

Figure 7A:
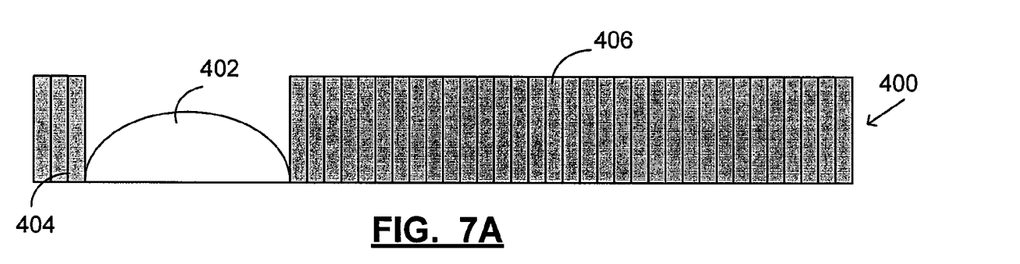
FIGS. 7A-7D are a series of spectral plots showing the operation of a mobile device, having two potentially interfering communication subsystems, according to the communication control method for a second scenario.
Figure 7B:
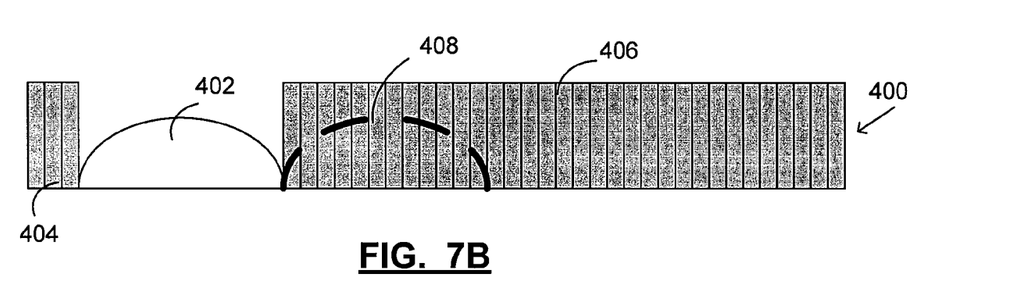
Figure 7C:
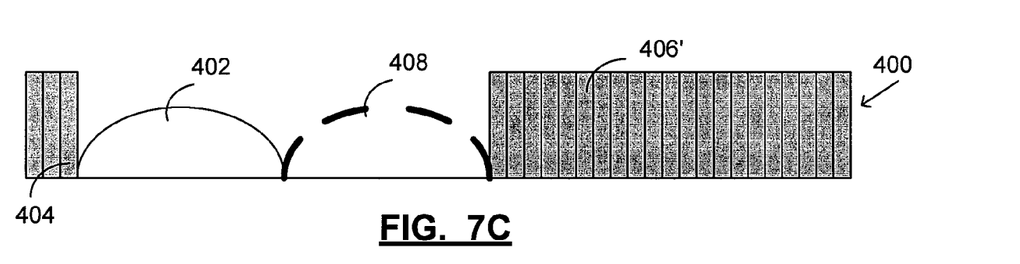
Figure 7D:
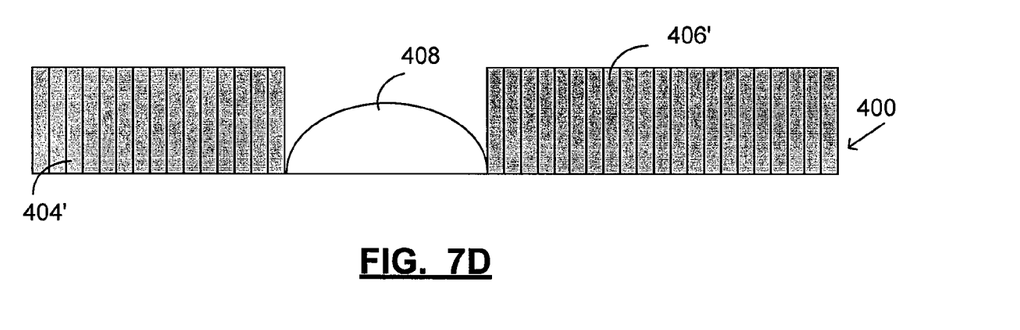

Referring now to FIGS. 7A-7D, shown therein are a series of spectral plots showing the operation of a mobile device, having potentially interfering long-range and short-range radios, according to the communication control method 350 for a second scenario. The second scenario is similar to the first scenario except that the association request made by the first radio 304 is successful. Accordingly, FIGS. 7A-7C are similar to FIGS. 6A-6C. However, FIG. 7D now shows that the first radio 304 is operating at the proposed operating frequency region 408, and the second operating frequency region at which the second radio 306 operates includes channels in the frequency sub-region 404' (which includes the first operating frequency region 402 that the first radio 304 was previously operating at) and the frequency sub-region 406'.

Figure 8A:
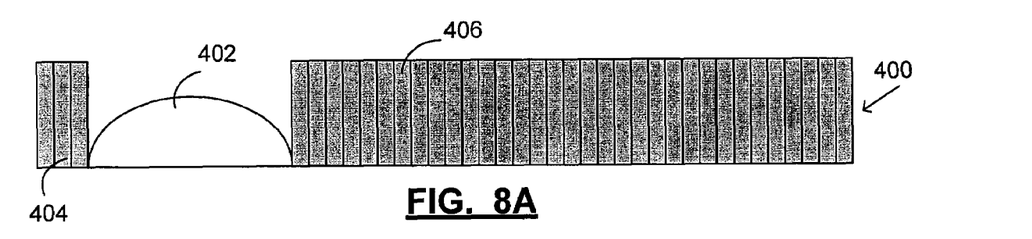
FIGS. 8A-8F are a series of spectral plots showing the operation of a mobile device, having two potentially interfering communication subsystems, according to the communication control method for a third scenario.
Figure 8B:
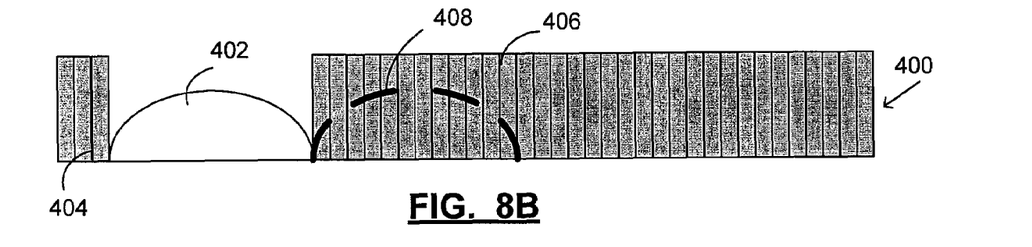
Figure 8C:
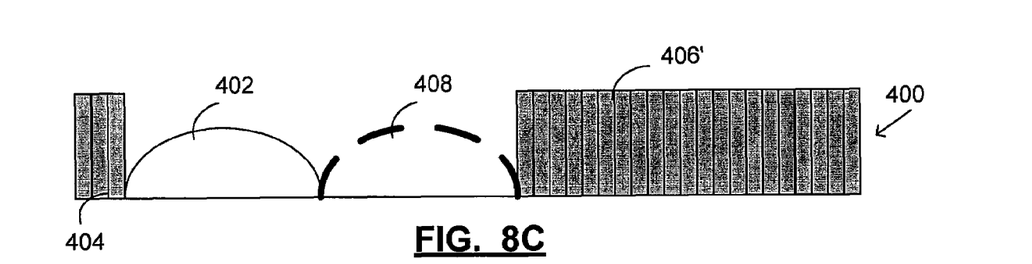
Figure 8D:
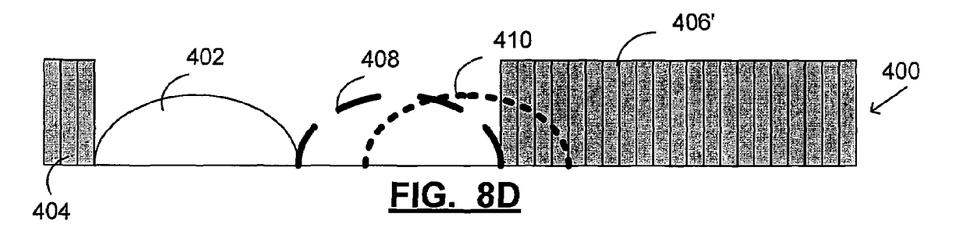
Figure 8E:
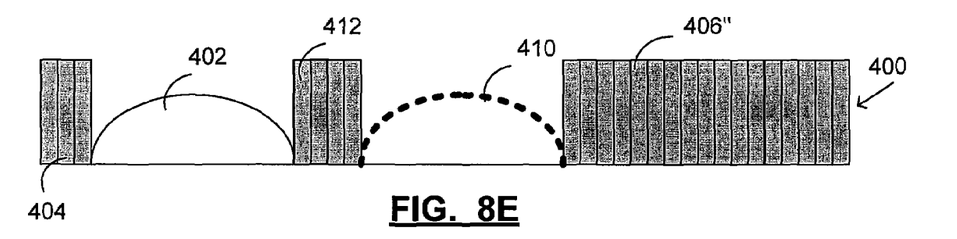
Figure 8F:
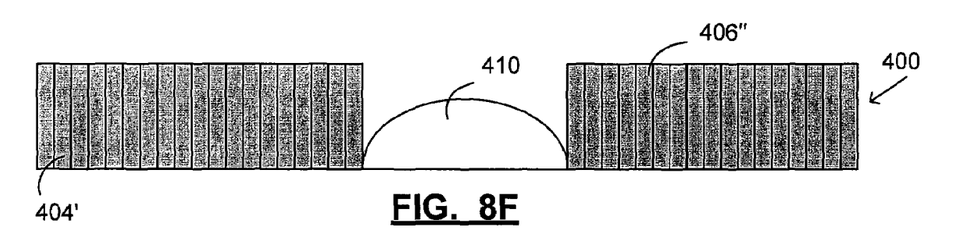

Referring now to FIGS. 8A-8F, shown therein are a series of spectral plots showing the operation of a mobile device, having potentially interfering long-range and short-range radios, according to the communication control method 350 for a third scenario. The third scenario is a combination of the first and second scenarios in that the first attempt of the first radio 304 to operate at a new proposed operating frequency region is unsuccessful but the second attempt is successful. Accordingly, FIGS. 8A-8C are similar to FIGS. 6A-6C. However, rather then going through a two-step procedure for a failed association attempt, as described in method 350, FIG. 8D shows a variation in method 350 in which a one-step procedure is used. According to method 350, after the unsuccessful attempt by the first radio 304 to switch to the first proposed operating frequency region 408, all of the channels in this frequency region would have been made available to the second radio 306 before the next attempt by the first radio 304 to operate at the next proposed operating frequency region 410. However, FIGS. 8D and 8E show that the method 350 can be augmented such that there can be a simultaneous attempt at the next proposed operating frequency region 410 while the host controller 302 instructs the second radio 306 to adjust the available channels. In this case, the available channels are in frequency sub-region 412 that is a portion of the first proposed operating frequency region 408 and in frequency sub-region 406" which is a portion of the previous operating sub-region 406' for the second radio 306. FIG. 8F shows that the attempt to operate at the next proposed operating frequency region 410 is successful. The first radio 304 is now operating in the next proposed operating frequency region 410, and the second radio 306 operates in a second operating frequency region that includes frequency sub-regions 404' and 406".

Various embodiments are described herein for a communication control configuration and method that can be used for wireless communication devices having at least two radios that can potentially operate in the same frequency region. The control configuration and method can provide a pre-emptive channel reservation in anticipation of a channel switch for co-located single-channel and multi-channel hopping radios that occupy a common frequency region. The control schemes described herein reduce the likelihood that the two radios will interfere with one another during operation. The radios are initialized to operate in certain frequency regions and an assumption is made that the radios support a method of time division multiplexing such as PTA. A controller can then be used to control transitions by the radios to different operating frequency regions. For example, the controller can provide a level of control such that transitions of one of the radios to a new proposed operating frequency region occurs after ensuring that the other radio has adjusted their available communication channels based on the new proposed operating frequency region. In situations where one radio must maintain a minimum amount of frequency spreading, the control scheme can provide signaling in a timely manner in order to ensure that on average the radio maintains the minimum required spreading.

In one aspect, at least one embodiment described herein provides a mobile communication device comprising: a host controller; a first radio coupled to the host controller, the first radio operating in a first operating frequency region; and a second radio coupled to the host controller, the second radio operating in a second operating frequency region. The first and second radios employ a form of time division multiplexing. The host controller is adapted to ensure that the second radio updates the second operating frequency region to exclude frequencies in a proposed operating frequency region prior to allowing the first radio to operate at the proposed operating frequency region.

The host controller can be adapted to inform the second radio when the first radio requests operation at the proposed operating frequency region, and the host controller can be adapted to inform the first radio to probe for operation at the proposed operating frequency region after receiving an acknowledgement from the second radio that the second operating frequency region has been updated.

The host controller can be adapted to instruct the second radio based on the result of the probe, and the second radio can be adapted to update the second operating frequency region based on the result of the probe.

If the probe is successful, the second radio can be adapted to update the second operating frequency region to include frequencies in the first operating frequency region.

Alternatively, if the probe is unsuccessful, the second radio can be adapted to update the second operating frequency region to include frequencies in the proposed operating frequency region.

Alternatively, if the probe is unsuccessful, the first radio can be adapted to request operation at an additional proposed operating frequency region, the host controller can be adapted to inform the second radio of the additional proposed operating frequency region, and the second radio can be adapted to update the second operating frequency region to exclude frequencies in the additional proposed operating frequency region.

The first and second operating frequency regions can be initialized to be exclusive of one another.

The first radio can be coupled to the second radio to provide communication there between.

The first radio can be a long-range wireless radio, and the second radio can be a short-range wireless radio. For instance, the first radio can be a WLAN radio, and the second radio can be a WPAN radio.

The first radio can be a Wireless Local Area Network (WLAN) radio, the second radio can be a Bluetooth (BT) radio, and the second radio can be adapted to exclude frequencies in the proposed operating frequency range while satisfying an average time for a minimum frequency spreading rule.

The WLAN radio can be adapted to perform active probing.

The host controller can be a main processor that controls the operation of the mobile communication device.

In another aspect, at least one embodiment described herein provides a method for controlling data communication for a mobile communication device having a first radio and a second radio. The first radio initially operates in a first operating frequency region, the second radio initially operates in a second operating frequency region, and the first and second radios employ a form of time division multiplexing. The method comprises:

determining that the first radio should operate at a proposed operating frequency region;

informing the second radio of the proposed operating frequency region change of the first radio;

updating the second operating frequency region to exclude frequencies in the proposed operating frequency region; and instructing the first radio to probe operation in the proposed operating frequency region after receiving acknowledgement that the second operating frequency region has been updated.

The method can further comprise informing the second radio based on the result of the probe; and updating the second operating frequency region based on the result of the probe.

If the probe is successful, the method can comprise updating the second operating frequency region to include frequencies in the first operating frequency region.

If the probe is unsuccessful, the method can comprise updating the second operating frequency region to include frequencies in the proposed operating frequency region.

If the probe is unsuccessful, the method can further comprise:

instructing the first radio to request operation at an additional proposed operating frequency region;

informing the second radio of the additional proposed operating frequency region; and updating the second operating frequency region to exclude frequencies in the additional proposed operating frequency region.

The method can further comprise initializing the first and second operating frequency regions to be exclusive of one another.

The method can further comprise providing a long-range wireless radio for the first radio, and a short-range wireless radio for the second radio.

The method can further comprise providing a Wireless Local Area Network (WLAN) radio for the first radio, a Bluetooth (BT) radio for the second radio, and excluding frequencies in the proposed operating frequency range while satisfying an average time for a minimum frequency spreading rule.

The method can further comprise configuring the WLAN radio to perform active probing.

In another aspect, at least one embodiment described herein provides a computer program product for controlling data communication for a mobile communication device having a first radio and a second radio, the computer program product comprising a computer readable medium embodying program code means executable by a processor for carrying out the method as described above.

It should be understood that various modifications can be made to the embodiments described and illustrated herein, without departing from these embodiments, the scope of which is defined in the appended claims.

The invention claimed is:

1. An electronic device comprising:
a host controller;
a first radio coupled to the host controller, the first radio comprising a Wireless Local Area Network (WLAN) radio configured to operate in a first operating frequency region; and
a second radio coupled to the host controller, the second radio comprising a Wireless Personal Area Network (WPAN) radio configured to operate in a second operating frequency region exclusive of the first operating frequency region;

the first and second radios configured to employ time division multiplexing; and the host controller configured to:

inform the second radio whenever the first radio requests operation at a proposed operating frequency region containing frequencies within the second operating frequency region;

ensure that the second radio updates the second operating frequency region to exclude frequencies in the proposed operating frequency region, prior to allowing the first radio to probe for operation at the proposed operating frequency region;

inform the first radio to probe for operation at the proposed operating frequency region, after receiving an acknowledgement from the second radio that the second operating frequency region has been updated; and instruct the second radio based on the result of the probe;

the second radio configured to update, if the probe is successful, the second operating frequency region to comprise frequencies in the first operating frequency region; and the second radio configured to update, the second operating frequency region to reclaim the frequencies in the proposed operating frequency region if the probe is unsuccessful and the first radio cannot operate in the proposed operating frequency region.

2. The electronic device of claim 1, wherein the first radio is adapted to request, if the probe is unsuccessful, operation at an additional proposed operating frequency region, wherein the host controller is adapted to inform the second radio of the additional proposed operating frequency region, and wherein the second radio is adapted to update the second operating frequency region to exclude frequencies in the additional proposed operating frequency region.

3. The electronic device of claim 1, wherein the first radio is coupled to the second radio to provide communication there between.

4. The electronic device of claim 1, wherein the second radio is adapted to exclude frequencies in the proposed operating frequency range while satisfying an average time for a minimum frequency spreading rule.

5. The electronic device of claim 1, wherein the WLAN radio is adapted to perform active probing.

6. The electronic device of claim 1, wherein the host controller is a main processor that controls the operation of the electronic device.

7. A method for controlling data communication for an electronic device the electronic device comprising;

A host controller;

a first radio operating coupled to the host controller, the first radio comprising a Wireless Local Area Network (WLAN) radio adapted to operating in a first operating region;

and a second radio coupled to the host controller, the second radio comprising a Wireless Personal Area Network (WPAN) radio adapted to operating in a second operating region;

the first and second radios employ a form of time division multiplexing; and wherein the host controller performs acts of a method that comprising:

informing the second radio whenever the first radio request operation at proposed operating frequency region containing frequencies within the second operating frequency region;

ensuring that the second radio updates the second operating frequency region to exclude frequencies in the proposed operating frequency region prior to allowing the first radio to probe or operate at the proposed operating frequency region;

informing the first radio to probe for operation at the proposed operating frequency region after receiving acknowledgement from the second radio that the second operating frequency region has been updated;

and instructing the second radio based on the results of the probe, the second radio updates the second operating frequency region to comprise frequencies in the first operating frequency region if the probe is successful and the second radio updates the second operating frequency region to reclaim frequencies in the proposed operating frequency region if the probe is unsuccessful and the first radio cannot operate in the proposed operating frequency region.

8. The method of claim 7, wherein if the probe is unsuccessful, the method further comprises:

instructing the first radio to request operation at an additional proposed operating frequency region;

informing the second radio of the additional proposed operating frequency region; and updating the second operating frequency region to exclude frequencies in the additional proposed operating frequency region.

9. The method of claim 7, wherein the method further comprises operating the second radio to exclude frequencies in the proposed operating frequency range while satisfying an average time for a minimum frequency spreading rule.

10. The method of claim 7, wherein the method further comprises configuring the WLAN radio to perform active probing.

11. A computer program product for controlling data communication for a device the mobile communication device comprising; A host controller; a first radio operating coupled to the host controller, the first radio comprising a Wireless Local Area Network (WLAN) radio configured to operate in a first operating region;

and a second radio coupled to the host controller, the second radio comprising a Wireless Personal Area Network (WPAN) radio configured to operate in a second frequency region exclusive of the first operating region;

the first and second radios employing time division multiplexing; and the computer program product comprises a non-transitory computer readable medium embodying program instructions executable by a host controller for carrying out acts of a method that comprises informing the second radio whenever the first radio requests operation at a proposed operating frequency region containing frequencies within the second operating frequency region;

ensuring that the second radio updates the second operating frequency region to exclude frequencies in the proposed operating frequency region prior to allowing the first radio to probe or operate at the proposed operating frequency region;

informing the first radio to probe for operation at the proposed operating frequency region after receiving acknowledgement from the second radio that the second operating frequency region has been updated;

and instructing the second radio based on the result of the probe;

the second radio updating the second operating frequency region to comprise frequencies in the first operating frequency region if the probe is successful; and the second radio updates the second operating frequency region to reclaim frequencies in the proposed operating frequency region if the probe is unsuccessful and the first radio cannot operate in the proposed operating frequency region.

* * * * *